United States Patent Office 2,712,990
Patented July 12, 1955

2,712,990

METHOD AND COMPOSITION FOR THE CONTROL OF UNDESIRED VEGETATION

Arthur W. Swezey, Garden Grove, Calif., assignor to The Dow Chemical Company, Midland, Mich., a corporation of Delaware No Drawing. Application November 23, 1951,
Serial No. 257,938

7 Claims. (Cl. 71—2.3)

This invention is concerned with the control of undesired vegetation and is particularly directed to a composition and method for preventing the growth of germinant seeds and young seedlings.

Sterilization of soil, as by the use of large amounts of salt, has been practiced on occasion since ancient times. More recently other inorganic materials such as the chlorates, arsenites, and borax have found specialized uses in the control of undesired vegetation but the concept of selective chemical control of weeds or other noxious vegetation is of fairly recent origin. The wide acceptance of chemical weed control practice has high-lighted certain deficiencies in commonly recommended procedures. Thus, the herbicidal chemicals currently used are frequently applied as sprays or dusts to vegetation in an advanced stage of growth and at a time when weeds have already depleted the soil of moisture and nutrients. Moreover, the application of such chemicals to mature weed growth is limited by the possibility of injury to interplanted crop plants or to adjacent desirable vegetation.

It is an object of the present invention to provide an improved method for the control of undesired vegetation. A further object is to provide a method for the control of vegetation before it has had an opportunity to deplete soil reserves of nutrients and moisture. Another object is to provide a method for accomplishing the temporary sterilization of soil areas. Yet another object is to provide for accomplishing the control of undesired vegetation while decreasing the likelihood of injury to nearby desirable plants. An additional object is the provision of a novel composition adapted to be employed for the accomplishment of the indicated herbicidal control. Other objects will become apparent from the following specification and claims.

In accordance with the present invention, it has been discovered that germinant seeds and young seedlings of many plants are controlled by contacting the plant or plant parts with a trichlorophenoxyalkanol of the formula

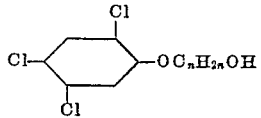

wherein $n$ is an integer from 2 to 3, inclusive. These compounds have been found to be particularly active when in contact with the roots of newly germinated seedlings, especially those of broadleafed plants. On the other hand, they have been found to be not particularly active in their effect on the aerial portion of mature plants in comparison to the conventional plant growth control agents such as the naphthoxy and haloaryloxy aliphatic acids. Thus, by the use of the compounds of the present invention, the control of undesired seedlings may be accomplished while largely avoiding the possibility of injury to the succulent leaf and stem portions of well developed or mature desirable vegetation.

In operating in accordance with the invention the toxic compound is distributed in or on soil or other growth medium such as peat or compost ordinarily infested with the seeds or young seedlings of the vegetation concerned. Any suitable means of distribution may be used provided that the active compound is positioned so that the roots or other tender growth organs of the newly germinated seedlings are subjected to the action of the trichlorophenoxyalkanol. The results to be obtained are largely determined by the amount of the chlorophenoxyalkanol compound applied to a given area of growth medium. When using large amounts of the active compounds a temporary sterilization of the growth medium is obtained whereas with suitable smaller dosages a selective herbicidal effect is achieved since there appears to be a considerable specificity of action with respect to the seedlings of the broadleafed as against the gramineous plants. Under normal conditions of moisture, aeration, and bacterial action, the herbicidal effect of reasonable dosages of the toxicant is dissipated within a few weeks although higher dosages may persist for several months.

In carrying out the invention, the trichlorophenoxyalkanols may be compounded to form either dust or spray compositions. A preferred embodiment of the invention includes mixtures of the active ingredient with a finely divided inert solid such as talc, pyrophyllite, gypsum, diatomaceous earth and the like. Similarly combinations of the trichlorophenoxyalkanols with fertilizers or other soil conditions may be used.

Where the mixture of solid diluent is to be applied as a dust, the inclusion of wetting, sticking and emulsifying agents in the above described finely divided composition is optional. Where it is desired to apply the active ingredient as a dispersion in water, one embodiment of the invention consists of a finely divided mixture including the active toxicant and a suitable surface-active dispersing agent and employed as a concentrate. A finely divided inert solid may be included in such concentrate composition.

Wetting, emulsifying, and surface-active dispersing agents compatible in the present compositions include alkali and alkaline earth metal caseinates, blood albumen, alkali metal salts of long chain aliphatic sulfates and alkyl aryl sulfonate, partially neutralized sulfuric acid derivatives of petroleum oils and naturally occurring glycerides, sulfonated derivatives of phenols and aromatic acids and their salts, soaps, lignin derivatives, condensation products of alkylene oxides with phenols and organic acids, alkanolamines, complex ether-alcohols and esters, and clays such as fuller's earth, attapulgite, bentonite and the like. In utilizing the clay minerals as dispersing agents it is frequently desirable to utilize an excess of such agent over and above the minimum necessary for dispersing the composition, the excess clay mineral then acting as a finely divided diluent and carrier.

In an alternative method of carrying out the invention the trichlorophenoxyalkanol is compounded with an emulsifying agent with or without additional organic carrier, as desired, to prepare an emulsifiable liquid concentrate which is suitable for dispersion in water or dilution with oil to prepare dilute spray mixtures. In this embodiment of the invention, the preferred emulsifying agents are oil soluble and particularly include the non-ionic emulsifiers such as the condensation products of alkylene oxides with phenols and organic acids, polyoxyethylene derivatives of sorbitan esters, complex ether-alcohols and the like. However, oil soluble ionic emulsifying agents such as mahogany soaps from the sulfonation of petroleum may also be used. Suitable organic carriers include petroleum oil and distillates, lower aliphatic ketones and alcohols, liquid halo-hydrocarbons and synthetic organic oils.

The proportions of materials employed in the compositions may vary considerably, depending on how the composition is to be employed, and whether or not it is designed as a concentrate. Dust compositions for direct application to soil may contain from as little as 0.25 percent to 50 percent or more by weight of the active ingredient. For use as a concentrate in the preparation of sprays or more dilute dusts, the compositions of the invention may contain from 10 percent to as high as 90 to 95 percent by weight of the active alkanol ingredients, the balance of the composition being one of the diluents and carriers and/or wetting and surface-active dispersing agents previously mentioned. Liquid dispersions of the toxicant in water or an organic solvent similarly may vary in concentration from a very low percentage of the active ingredient, e. g., 0.05 to 15.0 percent by weight where the dispersion is to be applied to the soil, to a relatively high percentage, e. g., 5 to 50 percent by weight, or higher, where the dispersion is to be employed as a concentrate.

The compositions of the present invention are conveniently applied to or dispersed in the soil by either spraying or dusting. Alternatively, they may be dispersed in irrigation water and so distributed over and thru the soil. The techniques involved in the application of spray and dust materials are well established and conventional equipment suffices in the present situation. It is required, however, that relatively uniform distribution of the treating compositions be obtained and that the compositions as deposited on or in the soil provide a toxic concentration of the active ingredient so positioned as to contact the organs of emerging seedlings of the undesired vegetation. Where dusting is employed, the surface of the soil may be dragged or otherwise worked to distribute the toxicant. In general, the toxic ingredient is distributed through the upper inch or less of the growth medium when practicing pre-emergent and selective weed control, and it is preferred that the distribution be through the upper ¼ inch to ¾ inch. In such applications, good results are obtained when the toxicant is placed in the zone of maximal weed seed germination but above the region of crop root growth. However, in applying heavier dosages for temporary sterilization, it is sometimes desirable that the substituted alkanol compound be distributed through the upper three to six inches of the growth medium.

The amount of trichlorophenoxyalkanol to be applied varies considerably depending on such factors as growth conditions, the species to be controlled and whether selective action or temporary sterilization is desired. Good results have been obtained when using from about 1 pound to 200 pounds of the toxic ingredient per acre. Where selective control is desired in vigorously growing crops such as sugar cane or the cereal grains, sensitive species such as mustard are controlled by application of 1 to 5 pounds of the alkanol compound per acre, while 10 pounds or more may be required for selective control of more resistant species. From 50 to 200 pounds per acre is used in effecting temporary sterilization. In operating at the lower dosages commercially useful control of sensitive plants is frequently obtained through depression of germination and stunting of growth of the sensitive, undesired plants without complete killing thereof since the resistant crop can meanwhile make vigorous growth and successfully compete with the weeds thereafter. By the application of the toxicants, as set forth above, the concentration of the active ingredient in the growth medium will be dependent not only on the weight of chemical dispensed per acre but also on the depth of soil through which the compound is dispersed. Such concentration is not considered critical provided that the effective ingredients is distributed through the growth medium to achieve at least a minimum toxic dosage in the zone of seed germination. The exact minimum dosage varies with the plant species, temperature, moisture and the type of soil concerned but good results have been obtained when the substituted alkanol compound is distributed through the zone of seed germination in the proportion of at least 0.1 pound of toxicant per cubic yard of growth medium.

In one preferred embodiment of the invention, the trichlorophenoxyalkanol compounds are applied in the form of a dust or spray as set forth above to prepared seed beds previously planted to large seeded resistant crops. In such application, any distribution procedure such as dragging is carefully controlled so as to avoid disturbing the seed of the desired crop plant. Nevertheless, it is desirable that the toxic chemical be distributed through the uppermost layer of the soil. Thus, the active compound is maintained in the area where it most conveniently controls the emergence of the rapidly germinating small seeded weeds such as purslane, pigweed, chenopodium species and wild mustard, while the more deeply planted crop plant germanates and growths with little or no effect from the chemical. A similar procedure of pre-emergence weed control is suitable for use with crops in which a budded stem portion is planted, for example, with sugar cane and potatoes.

Alternatively, the area to be planted is fitted and the treatment for weed control is carried out two weeks or more before planting with a desired crop and particularly a broadleafed crop. By such a procedure the weed seedlings in the surface layer of growth medium are controlled and the effect of the chemical is thereafter dissipated. In subsequent planting to a crop, a minimum of disturbance of the previously treated surface is desirable in order not to bring to or near the surface new and viable seeds which on germination would yield a fresh stand of undesired vegetation.

The trichlorophenoxyalkanols are conveniently prepared by reacting one molecular proportion of an alkali-metal 2,4,5-trichlorophenate with one molecular proportion of a haloalkanol such as ethylene chlorohydrin, propylene bromohydrin, 3-bromo-1-propanol and the like. In one method of making the compounds, the reactants are mixed and heated together in an aqueous medium for an hour or longer with stirring and at a temperature of from about 40° to 90° C. The resulting product may be freed of impurities by conventional methods, as by extraction, washing with water and distillation under vacuum. Representative trichlorophenoxyalkanols have the following properties:

| Compound | Melting point |
| --- | --- |
| 2-(2,4,5-trichlorophenoxy)-ethanol | 66.5°–68.5° C. |
| 1-(2,4,5-trichlorophenoxy)-2-propanol | 47.8°–48° C. |

The following examples illustrate the invention but are not to be construed as limiting:

*Example 1*

Seventeen parts by weight of 1-(2,4,5-trichlorophenoxy)-2-propanol and 83 parts by weight of an attapulgite clay (Attaclay) were mixed and ground together in a roller mill. The resulting composition was applied to areas of sandy loam soil at the rate of 192 pounds of the active propanol compound per acre and thoroughly mixed throughout the upper 3 inches of the soil. Seed of rye and canary grass, redweed, mustard, bur clover and a Lactuca species were sown in the treated areas. At subsequent, successive intervals of approximately 30 days the treated area was observed to determine any germination of seed and growth of seedlings. Following such observations the upper 3 inches of soil were broken up, thoroughly mixed and replanted with fresh seed as described above. The test area was equipped for overhead irrigation and received the equivalent of about 4 inches of rain per month. On observation about 30 and 60 days after initiation of the test no broadleafed or gramineous species were found alive in the treated areas. After 6 successive plantings, observations made over 7 months after the initiation of the test showed no germination or growth of broadleafed species in the treated areas. In the fourth, fifth and sixth plantings there was poor germination of grasses and those gramineous seedlings which emerged were stunted until after the sixth planting. Seed of the same species of test plants sown in adjacent untreated areas at the time of each of the above plantings germinated normally and the resultant seedlings made vigorous growth.

*Example 2*

1-(2,4,5-trichlorophenoxy)-2-propanol was compounded into a formulation having the following composition:

| | Pounds |
|---|---|
| 1-(2,4,5-trichlorophenoxy)-2-propanol | 2 |
| Surface active dispersing agent | ⅝ |
| Toluene, q. s. to make 1 gallon. | |

The surface active dispersing agent used is identified as a dibutylphenol-alkylene oxide condensation product. The latter and the active ingredient were weighed out and thoroughly mixed at room temperature with sufficient of the toluene to prepare a homogeneous solution. The composition was then completed by diluting to the desired volume with a further amount of toluene. The resulting composition was dispersed in water to prepare an aqueous spray dispersion containing 25 pounds of the active propanol compound per 100 gallons of aqueous spray. The spray dispersion so prepared was applied at the rate of 200 gallons per acre with conventional spray equipment to plots of Yolo loam soil which had been worked up into a seed bed condition.

These plots received no further treatment other than irrigation during a period of 6 months. During this period the plots received the equivalent of 15 inches of rain including both natural precipitation and artificial irrigation. At the end of the 6 month fallow period seed of canary, rye and water grasses, pigweed, lamb's quarters and mustard were sown in the treated areas and in adjacent untreated areas of the same soil which had been freshly worked into a seed bed condition. Three weeks after planting the seed the plots were observed for germination and growth. All species had germinated and were growing vigorously in the untreated check plots. In contrast, in the treated areas emergence of seedlings was only about 3 percent of that in the untreated areas for both broadleafed and gramineous species and the seedlings which emerged were severely stunted.

*Example 3*

The following composition was prepared by thoroughly mixing the ingredients at room temperature:

| | Parts by weight |
|---|---|
| 1-(2,4,5-trichlorophenoxy)-2-propanol | 25 |
| Surface active dispersing agent | 10 |
| Toluene | 65 |

The surface active dispersing agent used was identical to that set forth in Example 2. The above composition was dispersed in water to prepare an aqueous spray dispersion containing 50 pounds of the active ingredient per 100 gallons of spray. This composition was employed for the control of grasses and weeds in a sandy loam soil about an industrial area. The composition was applied at the rate of 200 gallons per acre to plots of ½₀₀ acre area with a power spray rig operating at a pressure of 75 pounds per square inch. The treatment was applied in triplicate. At the time of application no annular grasses or broadleafed weeds were present in the treated area or in adjacent untreated check areas. Between the time of treatment and the termination of the test there was about 7 inches of rainfall. Approximately 6 months after the spray application observations were made as to the growth of annual weeds in the treated and untreated areas. A vigorous stand of wild oat, telegraph weeds and Australian brass button weeds had become established in the untreated check areas whereas the treated areas were completely free of annual weed species.

*Example 4*

The composition of Example 2 was dispersed in water at the rate of 1 quart of composition per 100 gallons of finished spray and the resultant dilute spray dispersion sprayed at the rate of 200 gallons per acre on areas of soil which were infested with the seed of mustard and bur clover and which had been planted 24 hours prior to the spray with seed of annual rye grass. Two weeks later the treated area was observed and the grass was found to have emerged and grown vigorously. In contrast mustard and bur clover showed an emergence of only 20 percent as compared to adjacent areas of similarly infested soil and the plants which emerged were stunted.

*Example 5*

2-(2,4,5-trichlorophenoxy)ethanol and a surface active dispersing agent (Triton X–100), identified as an octalphenol-polyethylene oxide condensation product, were dissolved and diluted to volume with acetone to prepare a composition containing 0.5 pound of the active ethanol compound and 0.5 pound of the dispersing agent per gallon of solution. The resulting composition was dispersed in water to prepare an aqueous spray dispersion containing 3.5 pounds of the active ethanol material per 100 gallons of finished spray. This dilute spray dispersion was applied at the rate of 100 gallons per acre to areas of Hanford sandy loam soil which had been prepared as a seed bed and planted 24 hours prior to spraying with seed of radish, canary grass, water grass, bur clover, lamb's quarters and pigweed. Adjacent untreated areas of soil were seeded with the same species to serve as a check. The seed bed areas were kept moist by periodical irrigation and the ambient conditions of temperature and sunlight were excellent for promoting germination. The trichlorophenoxy-ethanol compound appeared to be distributed through the top quarter inch of the soil.

One month after treatment the areas were observed for the growth of plants. No plants were found in the treated areas except for a few scattered and stunted grasses. In contrast the untreated check areas showed a dense growth of vigorously growing plants of both broadleafed and gramineous species.

I claim:

1. A method for inhibiting the growth of vegetation which comprises the step of exposing seedling roots and germinating seed to the action of a growth-inhibiting amount of a compound having the formula

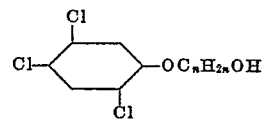

wherein $n$ is an integer from 2 to 3, inclusive, such exposure being accomplished under conditions normally leading to the growth of the vegetation concerned.

2. A method for the control of the growth of undesired vegetation which comprises distributing in the soil and in close proximity to the seeds and the roots of young seedlings of such vegetation a compound of the formula

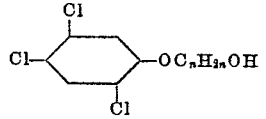

wherein $n$ is an integer from 2 to 3, inclusive, the concentration of the compound in the soil being such as to be toxic to the organs of the seedling plants.

3. A method for inhibiting the growth of seedlings which comprises the step of contacting seed, while positioned in a growth medium, with a growth-inhibiting amount of a compound having the formula

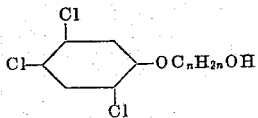

wherein $n$ is an integer from 2 to 3, inclusive.

4. A growth-inhibiting composition comprising a carrier and dispersed therein as an active ingredient a growth-inhibiting amount of a compound of the formula

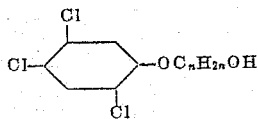

wherein $n$ is an integer from 2 to 3, inclusive.

5. A growth-inhibiting composition comprising an active ingredient in intimate mixture with a surface-active dispersing agent, such agent being capable of facilitating the dispersion of the composition in water, and the active ingredient consisting of a compound of the formula

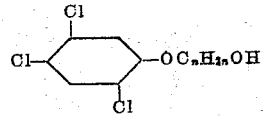

wherein $n$ is an integer from 2 to 3, inclusive, said active ingredient being employed in the amount of 5 to 95 percent by weight of the composition.

6. A method for controlling the growth of undesired vegetation which comprises distributing 2-(2,4,5-trichlorophenoxy)ethanol in the soil and in close proximity to the seeds and young seedling roots of such vegetation, the concentration of the substituted ethanol compound being such as to be toxic to the organs of the plants.

7. A method for controlling the growth of undesired vegetation which comprises distributing 1-(2,4,5-trichlorophenoxy)-2-propanol in the soil and in close proximity to the seeds and young seedling roots of such vegetation, the concentration of the substituted propanol compound being such as to be toxic to the organs of the plants.

References Cited in the file of this patent

UNITED STATES PATENTS 2,158,958     Coleman _____ May 16, 1939

OTHER REFERENCES

Botanical Gazette, vol. 107 (1946), pages 475 to 507.